(12) United States Patent
Hwangbo et al.

(10) Patent No.: US 11,565,649 B2
(45) Date of Patent: Jan. 31, 2023

(54) HEADREST AIRBAG OF VEHICLE

(71) Applicant: HYUNDAI MOBIS CO., LTD., Seoul (KR)

(72) Inventors: Sang Won Hwangbo, Yongin-si (KR); Kyu Sang Lee, Yongin-si (KR); Jiwoon Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/587,094

(22) Filed: Jan. 28, 2022

(65) Prior Publication Data

US 2022/0250577 A1 Aug. 11, 2022

(30) Foreign Application Priority Data

Feb. 5, 2021 (KR) ......................... 10-2021-0016818

(51) Int. Cl.
*B60R 21/231* (2011.01)

(52) U.S. Cl.
CPC ................ *B60R 21/23138* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 6,199,900 B1 * | 3/2001 | Zeigler .................. | B60N 2/882 297/216.12 |
| 10,071,702 B2 * | 9/2018 | Ohno ..................... | B60R 21/207 |
| 10,556,563 B2 * | 2/2020 | Song .................... | B60R 21/2338 |
| 10,933,831 B2 * | 3/2021 | Kim ..................... | B60R 21/2338 |

FOREIGN PATENT DOCUMENTS

| | | | | |
|---|---|---|---|---|
| CN | 205652092 U | * | 10/2016 | ........... B60R 21/207 |
| CN | 106467081 A | * | 3/2017 | ........... B60N 2/4805 |
| DE | 19626761 C1 | * | 10/1997 | ........... B60N 2/4876 |
| JP | H106907 A | * | 1/1998 | ............. B60R 21/22 |
| JP | 2006335140 A | * | 12/2006 | ........... B60R 21/207 |
| JP | 2008030528 A | * | 2/2008 | ........... B60R 21/207 |
| JP | 2011051526 A | * | 3/2011 | ........... B60R 21/207 |
| KR | 20020052275 A | * | 7/2002 | ........... B60R 21/207 |
| KR | 20040088222 A | * | 12/2004 | ................ C02F 1/66 |
| KR | 10-0500677 | | 7/2005 | |
| KR | 20080099710 A | * | 11/2008 | ............. B60N 2/888 |
| KR | 101510656 B1 | * | 4/2015 | ........... B60R 21/207 |

\* cited by examiner

*Primary Examiner* — Faye M Fleming
(74) *Attorney, Agent, or Firm* — NovoTechIP International PLLC

(57) ABSTRACT

A headrest airbag of a vehicle is proposed. The headrest airbag includes an inflator located inside a seatback, and connected to a headrest stay and configured to supply gas through the headrest stay during operation thereof, and an airbag cushion located inside the headrest, and configured to expand when being supplied with the gas through the headrest stay and to be unfolded outside of the headrest.

9 Claims, 5 Drawing Sheets

HEADREST AIRBAG OF VEHICLE

CROSS-REFERENCE TO RELATED APPLICATIONS

The present application claims priority to Korean Patent Application No. 10-2021-0016818, filed Feb. 5, 2021, the entire contents of which is incorporated herein for all purposes by this reference.

BACKGROUND

1. Technical Field

The present invention relates generally to a headrest airbag of a vehicle, the headrest airbag including an inflator and an airbag cushion that are separately located at a seatback and a headrest, respectively, and being configured to supply gas into the airbag cushion through a stay of the headrest.

2. Discussion of Related Art

A headrest airbag is an airbag provided at an upper end of a seatback of a vehicle and provided at a headrest supporting the head of an occupant. The headrest airbag is unfolded in a collision of the vehicle to protect the head of the occupant. In an existing headrest airbag, an airbag module is mounted to the inside of the headrest and increases a foreign body sensation of the occupant so that the occupant feels discomfort. Since an inflator provided for inflating the airbag is mounted to the headrest, in unfolding of the airbag, explosive sound of the airbag may be generated around the head of the occupant and may damage the occupant's hearing Therefore, it is necessary to develop a headrest that prevents an occupant from feeling a foreign body sensation from the headrest and that may safely protect the head of the occupant without damage in unfolding of the airbag with the inflator provided at a location spaced apart from the headrest.

The foregoing described as the controller and the controlling method of operating a fuel cell is intended merely to aid in the understanding of the background of the present invention, and is not intended to mean that the present invention falls within the purview of the related art that is already known to those skilled in the art.

SUMMARY

Accordingly, the present invention has been made keeping in mind the above problem occurring in the related art, and the present invention is intended to provide a headrest airbag of a vehicle, wherein the headrest airbag includes an inflator and an airbag cushion that are separately located in a seatback and a headrest, respectively, and the headrest airbag is configured to supply gas into the airbag cushion through a stay of the headrest with the inflator coupled to an end of the stay of the headrest.

In order to achieve the above objective, according to one aspect of the present invention, there is provided a headrest airbag of a vehicle, the headrest airbag including: an inflator located inside a seatback, and connected to a stay of a headrest (hereinafter, which will refer to as the headrest stay) and configured to supply gas through the headrest stay during operation thereof; and an airbag cushion located inside the headrest, and configured to expand when being supplied with the gas through the headrest stay and to be unfolded outside of the headrest.

The headrest stay may have a tubular shape extended with an empty inside portion, and the inflator may be located at an end of the headrest stay and be configured to supply the gas into the airbag cushion through the inside portion of the headrest stay.

The inflator may be connected to the headrest stay by being directly connected to an end of the headrest stay or coupled to a connecting joint provided at the end of the headrest stay.

The connecting joint may be made of an elastic material, and when the inflator is coupled to the connecting joint, the connecting joint may contract when the headrest stay slides.

The airbag cushion may be coupled to a connector, the connector branching off and protruding from the headrest stay inside the headrest, and the airbag cushion may be configured to be supplied with the gas from the headrest stay or the inflator through the connector.

The connector may have a tubular shape extended with an empty inside portion, and have a protrusion provided along an outer circumferential surface of an end thereof, and when the connector is coupled to the airbag cushion, the protrusion may be inserted into and coupled to an entrance of the airbag cushion.

The airbag cushion may include at least one airbag cushion provided at a side portion or an upper portion inside the headrest, and when the airbag cushion is supplied with the gas through the headrest stay, the at least one airbag cushion may expand and be unfolded toward a front surface of the headrest.

The airbag cushion may be provided along opposite side portions and upper portion inside the headrest, and when the airbag cushion is supplied with the gas through the headrest stay, the airbag cushion may expand and be unfolded toward a front surface of the headrest.

The inflator may include at least one inflator provided at an end of the headrest stay, and the at least one inflator may be configured to respectively supply the gas to at least one airbag cushion through the headrest stay.

A stitch portion may be provided on a front surface of the headrest along an edge of the headrest, and when the airbag cushion expands, as the stitch portion are torn off, the airbag cushion may be unfolded toward a front surface of the headrest.

The airbag cushion may include an outer panel configured to face an outside of a seat during unfolding thereof, an inner panel configured to face an inside of the seat during unfolding thereof, and an inner tether configured to fix the outer panel and the inner panel while crossing the outer panel and the inner panel in the airbag cushion.

According to the present invention, the headrest airbag of a vehicle includes the inflator and the airbag cushion that are separately located in the seatback and the headrest, respectively, and the inflator is coupled to the end of the stay of the headrest, so that gas can be supplied into the airbag cushion through the stay.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1:
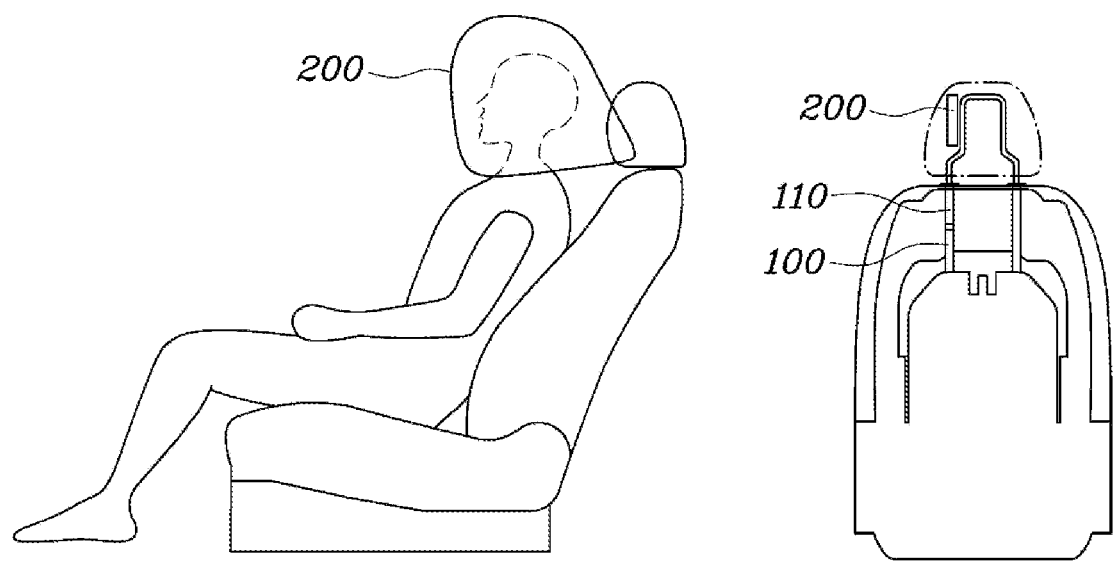
FIG. 1 is a view showing a headrest airbag of a vehicle according to an embodiment of the present invention.
Figure 2:
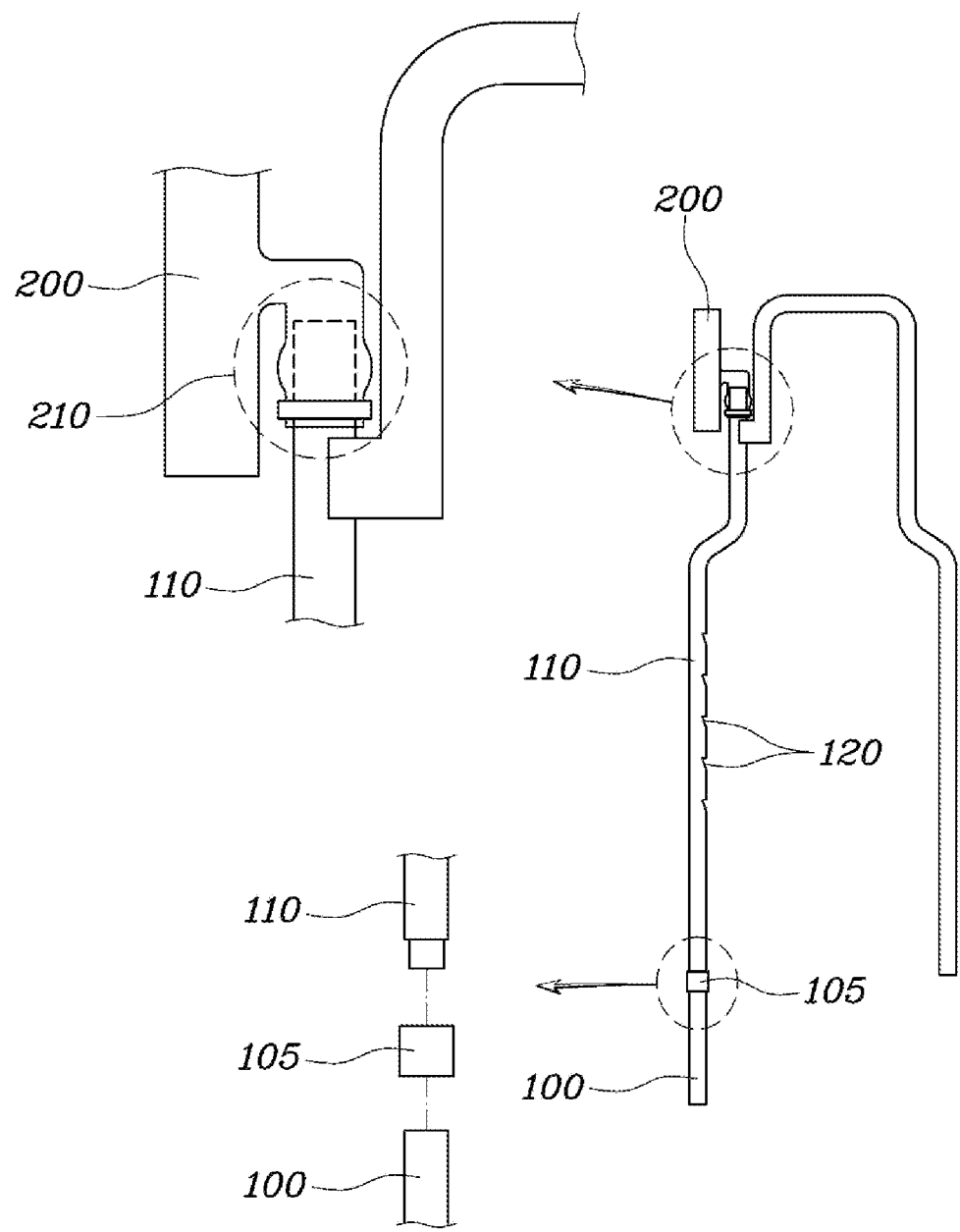
FIG. 2 is a view showing an inflator and an airbag cushion coupled to a stay of a headrest in the headrest airbag of a vehicle according to the embodiment of the present invention.
Figure 3:
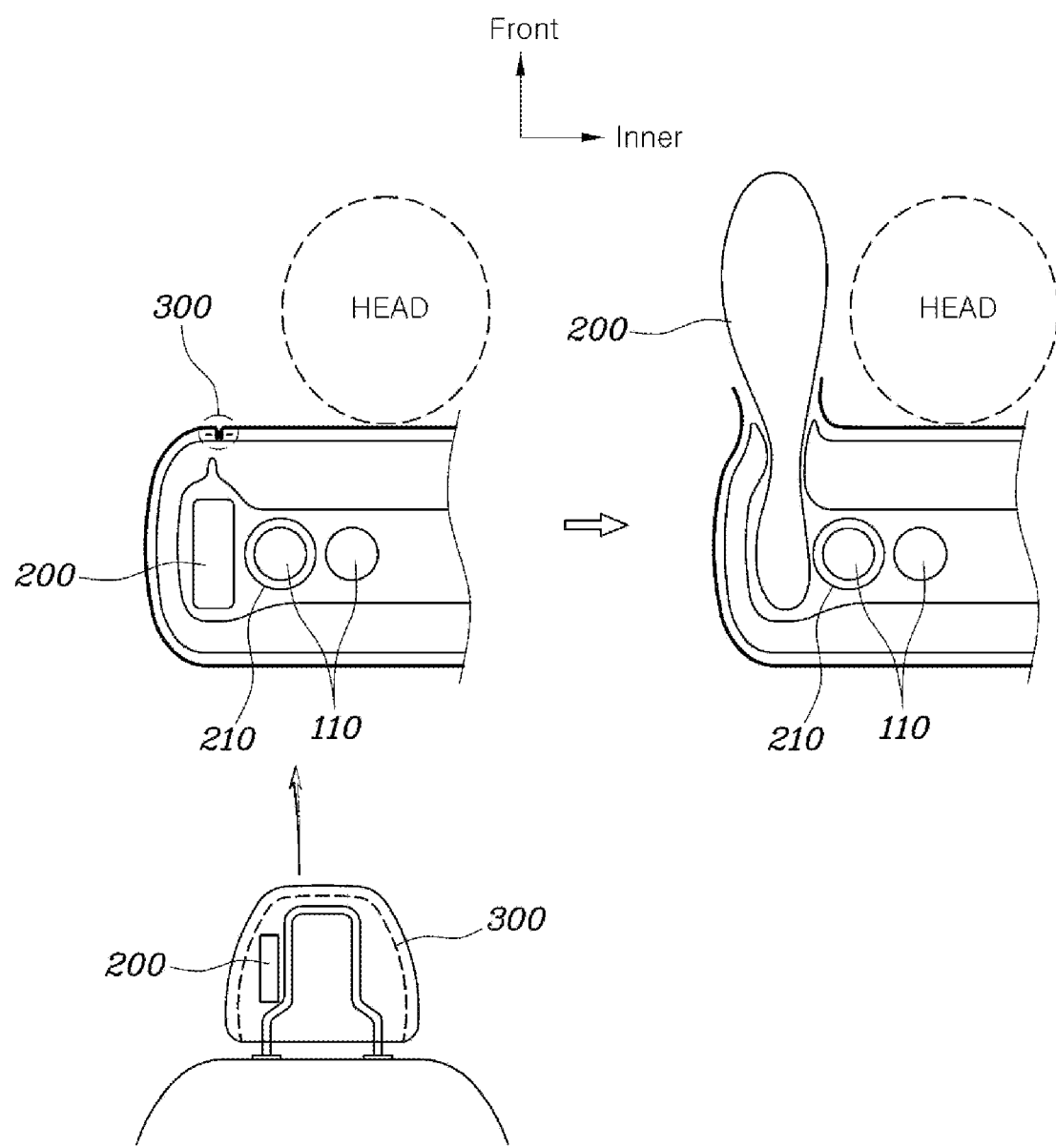
FIG. 3 is a view showing the airbag cushion unfolded from the headrest in the headrest airbag of a vehicle according to the embodiment of the present invention.
Figure 4:
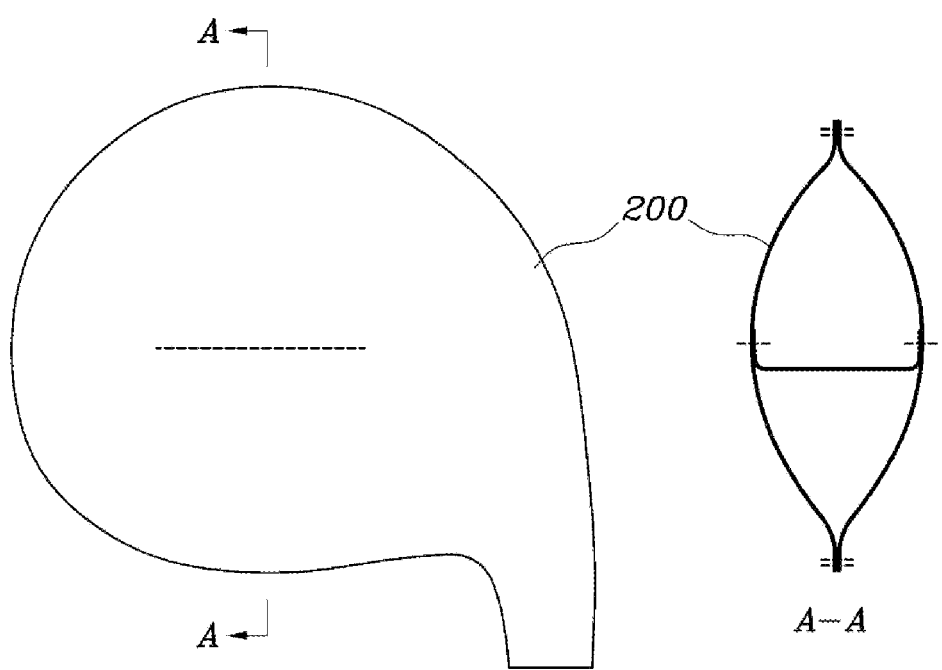
FIG. 4 is a view showing a section of an inner portion of the unfolded airbag cushion of the headrest airbag of a vehicle according to the embodiment of the present invention.
Figure 5:
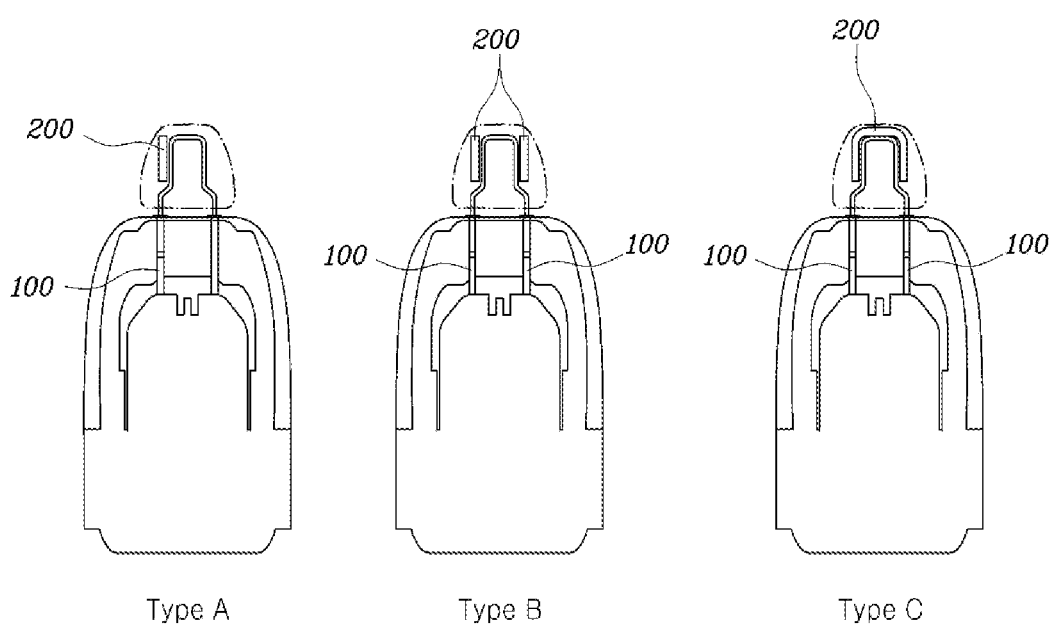
FIG. 5 is a view showing three exemplary types of the headrest airbag of a vehicle according to the embodiment of the present invention.

FIG. 1 is a view showing a headrest airbag of a vehicle according to an embodiment of the present invention. FIG. 2 is a view showing an inflator and an airbag cushion coupled to a stay of a headrest in the headrest airbag of a vehicle according to the embodiment of the present invention. FIG. 3 is a view showing the airbag cushion unfolded from the headrest in the headrest airbag of a vehicle according to the embodiment of the present invention. FIG. 4 is a view showing a section of an inner portion of the unfolded airbag cushion of the headrest airbag of a vehicle according to the embodiment of the present invention. FIG. 5 is a view showing three exemplary types of the headrest airbag of a vehicle according to the embodiment of the present invention.

FIG. 1 is a view showing a headrest airbag of a vehicle according to an embodiment of the present invention. According to the embodiment of the present invention, the vehicle has a seat, which includes a seatback and a headrest, and the headrest airbag is located within the seat. The headrest airbag includes (1) an inflator 100 connected to a stay 110 (hereinafter, which will refer to as the headrest stay) extending between the seatback and the headrest and supplying gas through the headrest stay 110 during operation thereof; and (2) an airbag cushion 200 located within the headrest and configured to inflate and unfold outside the headrest when being supplied with the gas through the headrest stay 110. The headrest stay may be configured to keep the headrest supported by the seatback.

Specifically, according to the embodiment of the present invention, the headrest airbag of a vehicle includes the airbag cushion 200 provided at one side portion of the headrest stay 110 inside the headrest by using the headrest stay 110 provided inside the headrest, thereby minimizing discomfort such as foreign body sensation of an occupant. Furthermore, the inflator 100 inflating the airbag cushion 200 is provided inside the seatback, not inside the headrest, and the headrest stay 110 is formed in a tubular shape with an empty inner space therein, and thus the inflator 100 injects gas into the airbag cushion 200 through the headrest stay 110. Therefore, when the airbag operates, noise occurs from the inflator 100 located at a location away from the head of the occupant, so that damage caused by noise that affects the occupant is minimized.

FIG. 2 is a view showing an inflator and an airbag cushion coupled to a stay of a headrest in the headrest airbag of a vehicle according to the embodiment of the present invention. According to the embodiment of the present invention, in the headrest airbag of a vehicle, the headrest stay 110 has the tubular shape extended with the empty inner space therein, and the inflator 100 may supply the gas into the airbag cushion through the inside portion of the headrest stay from an end of the headrest stay 110.

Furthermore, the inflator 100 may be directly connected to the end of the headrest stay 110 or be connected to the headrest stay 110 while being coupled to a connecting joint 105 provided at the end of the headrest stay 110. The connecting joint 105 is made of an elastic material. When the inflator 100 is coupled to the connecting joint 105, as the headrest stay 110 slides, the connecting joint 105 may contract.

Specifically, the inflator 100 of the seatback may inflate the airbag cushion 200 by supplying the gas into the airbag cushion 200 of the headrest through the inside portion of the headrest stay 110. The inflator 100 is directly fixed to the headrest stay 110 and may slide together with vertical sliding of the headrest. When the inflator 100 is coupled to the headrest stay 110 through the connecting joint 105, only the connecting joint 105 with elasticity stretches or contracts, and the inflator 100 may be firmly or stably mounted to a fixed location thereof and be normally operated.

Meanwhile, in the headrest airbag of a vehicle according to the embodiment of the present invention, the airbag cushion 200 is coupled to a connector 210 branching and protruding from the headrest stay 110 in the headrest, and the airbag cushion 200 may be supplied with gas from the headrest stay 110 or the inflator 100 through the connector 210. The connector 210 has a tubular shape extended with an empty inner space therein, and a protrusion is formed on an end of the connector 210 along an external circumferential surface thereof. When the connector 210 and the airbag cushion 200 are coupled to each other, the protrusion of the connector 210 may be inserted into an entrance of the airbag cushion 200 and coupled to the airbag cushion 200.

Specifically, the headrest stay 110 is formed in an 'n'-shape extended upward from a lower end thereof and providing a frame of the headrest. The airbag cushion 200 may be located at one side of the headrest stay 110 extended upward and located at the same level as a plan formed by the headrest stay 110, and the airbag cushion 200 may be firmly coupled to the headrest through the connector 210. The entrance of the airbag cushion 200 into which the gas is injected covers the connector 210 and then is firmly sealed using an assembly band so as to prevent the gas from leaking through the opening. In addition, as the airbag cushion 200 is provided at one portion of the same level as the level formed by the headrest stay 110 extended, when the occupant leans the head on the headrest, discomfort such as foreign body sensation caused by the headrest airbag may be minimized.

Meanwhile, an existing notch 120 formed on the headrest stay 110 to fix the headrest is moved upward without manipulation, and moved downward only by pressing a specific switch so as to release locking from a headrest guide. However, since the inflator 100 is located inside the seatback, with a shape of the existing notch 120 (right-angled triangle, shape shown in FIG. 2), the headrest may be moved upward when the inflator 100 is operated. Therefore, the notch 120 formed on the headrest stay 110 should be essentially shaped (e.g., rectangular shape) to prevent separation in vertical directions thereof, unlike the existing notch 120 shown in FIG. 2. When the height of the headrest is adjusted, the specific switch is operated as in the existing notch, so that locking of the notch may be released from the headrest guide.

FIG. 3 is a view showing the airbag cushion unfolded from the headrest in the headrest airbag of a vehicle according to the embodiment of the present invention. FIG. 5 is a view showing three exemplary types of the headrest airbag of a vehicle according to the embodiment of the present invention. According to the embodiment of the present invention, in the headrest airbag of a vehicle, the airbag cushion 200 includes at least one airbag cushion 200 provided at a side portion or an upper portion inside the headrest. When the airbag cushion 200 is supplied with the gas through the headrest stay 110, the airbag cushion inflates, expands and may be unfolded toward a front surface of the headrest. Furthermore, the airbag cushion 200 is provided in the headrest along opposite portions and the upper portions, and when the airbag cushion 200 is supplied with the gas through the headrest stay 110, the airbag cushion 200 expands and may be unfolded toward the front surface of the headrest.

Specifically, referring to FIG. 5, the airbag cushion 200 may include at least one airbag cushion 200 provided at a side portion in the headrest as shown in type A or type B in FIG. 5, or may be provided to surround front the side portions to the upper portion as shown in type C in FIG. 5. Accordingly, the inflator 100 includes at least one inflator 100 provided on an end of the headrest stay 110, and at least one inflator may supply the gas into at least one airbag cushion 200 through the headrest stay 110, respectively.

For example, one inflator may inject the gas into at least one airbag cushion 200 through the headrest stay 110 at the same time, and as shown in type B, and the inflator 100 is provided for each airbag cushion 200, so that the airbag cushion 200 may be separately operated. In a case where each airbag cushion 200 is separated operated, in a vehicle collision, a collision direction is detected and one of airbag cushions 200 that is provided in the collision direction preferentially expands, so that an impact applied to the head of the occupant may be minimized. Furthermore, in a case where the airbag cushion 200 is shaped to surround from the opposite side portions to the upper portion of the headrest as shown in type C, the inflator 100 is provided at each end of the headrest stay 110, so that the airbag cushion 200 with increased volume may be efficiently supplied with the gas.

Meanwhile, as shown in FIG. 3, the headrest airbag of a vehicle according to the embodiment of the present invention has a stitch portion 300 formed on the front surface of the headrest along an edge of the headrest. When the airbag cushion 200 expands, the stitch portion 300 is torn and the airbag cushion may be unfolded toward the front surface of the headrest. The stitch portion 300 is formed on the front surface of the headrest along the edge of the headrest or is formed in a part of a front surface of the airbag cushion 200. The stitch portion 300 serves to guide a direction where the airbag cushion 200 expands and protrudes. The stitch portion 300 is located at the side of the head of the occupant in unfolding of the airbag cushion 200, thereby protecting the head of the occupant.

FIG. 4 is a view showing a section of an inner portion of the unfolded airbag cushion of the headrest airbag of a vehicle according to the embodiment of the present invention. According to the embodiment of the present invention, the airbag cushion 200 in the headrest airbag of a vehicle may include an outer panel facing away from the seat in unfolding of the airbag cushion, an inner panel facing toward the seat in unfolding of the airbag cushion, and an inner tether fixing the outer panel and the inner panel while crossing the outer panel and the inner panel in the airbag cushion 200. In FIG. 4, the right drawing is a view showing a cut-out section of the airbag cushion 200 that expands. In the cut-out sectional view, a left curved line is the outer panel facing the outside of the head of the occupant, and a right curved line is the inner panel facing the head of the occupant. A line transversely crossing the outer panel and the inner panel is the inner tether, and the inner tether serves to guide the airbag cushion 200, so that the airbag cushion 200 may expand forward after the airbag cushion 200 transversely expands by a predetermined degree on the basis of the head of the occupant in unfolding of the airbag cushion.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A headrest airbag of a vehicle having a seat, the seat comprising (1) a seatback, (2) a headrest and (3) a headrest stay extending between the seatback and headrest and configured to keep the headrest supported by the seatback, the headrest airbag comprising:
    an inflator positioned within the seatback, connected to the headrest stay and configured to supply gas through the headrest stay;
    an airbag cushion positioned within the headrest and configured to inflate and unfold outside the headrest when the gas from the inflator is supplied thereto through the headrest stay; and
    a connecting joint coupled between the inflator and the headrest stay, comprising an elastic material and configured to contract when the headrest stay slides.

2. The headrest airbag of claim 1, wherein:
    the headrest stay has a tubular shape containing an empty inner space, and
    the inflator is connected to an end of the headrest stay and configured to supply the gas into the airbag cushion through the empty inner space of the headrest stay.

3. The headrest airbag of claim 1, further comprising a connector connected to the headrest stay within the headrest, wherein:
    the airbag cushion is coupled to the connector, and
    the gas from the inflator is supplied to the airbag cushion through the headrest stay and the connector.

4. A headrest airbag of claim 3, a vehicle having a seat, the seat comprising (1) a seatback, (2) a headrest and (3) a headrest stay extending between the seatback and headrest and configured to keep the headrest supported by the seatback, the headrest airbag comprising:
    an inflator positioned within the seatback, connected to the headrest stay and configured to supply gas through the headrest stay;
    an airbag cushion positioned within the headrest and configured to inflate and unfold outside the headrest when the gas from the inflator is supplied thereto through the headrest stay; and
    a connector connected to the headrest stay within the headrest,
    wherein the airbag cushion is coupled to the connector, and the gas from the inflator is supplied to the airbag cushion through the headrest stay and the connector, and
    wherein the connector has a tubular shape containing an empty inner space, and comprises a protrusion extending along an outer circumferential surface of an end of the connector, the protrusion being coupled to an entrance of the airbag cushion.

5. The headrest airbag of claim 1, wherein:
the airbag cushion includes a first airbag cushion positioned at a side portion or an upper portion of the headrest, and
the first airbag cushion is configured to expand and unfold toward a front surface of the headrest when supplied with the gas from the inflator.

6. The headrest airbag of claim 1, wherein:
the airbag cushion is positioned at two side portions and an upper portion of the headrest, and
the airbag cushion is configured to expand and unfold toward a front surface of the headrest when supplied with the gas from the inflator.

7. A headrest airbag of a vehicle having a seat, the seat comprising (1) a seatback, (2) a headrest and (3) a headrest stay extending between the seatback and headrest and configured to keep the headrest supported by the seatback, the headrest airbag comprising:
an inflator positioned within the seatback, connected to the headrest stay and configured to supply gas through the headrest stay; and
an airbag cushion positioned within the headrest and configured to inflate and unfold outside the headrest when the gas from the inflator is supplied thereto through the headrest stay,
wherein the airbag cushion comprises a plurality of airbag cushions, and
wherein the inflator includes a plurality of inflators including a first inflator, the first inflator positioned at an end of the headrest stay and configured to supply the gas to at least one of the plurality of airbag cushions through the headrest stay.

8. The headrest airbag of claim 1, wherein:
the headrest includes a stitch portion positioned on a front surface of the headrest and extending along an edge of the headrest, and
the stitch portion is configured to tear off when the airbag cushion inflates and cause the inflated airbag cushion to unfold toward a front surface of the headrest.

9. The headrest airbag of claim 1, wherein the airbag cushion comprises:
an outer panel configured to face away from the seat when the airbag cushion inflates and unfolds outside the headset;
an inner panel configured to face toward the seat when the airbag cushion inflates and unfolds outside the headset; and
an inner tether extending between the outer panel and the inner panel.

* * * * *